(No Model.)  4 Sheets—Sheet 2.
E. J. YOUNG.
MATCH MACHINE.
No. 553,888.  Patented Feb. 4, 1896.
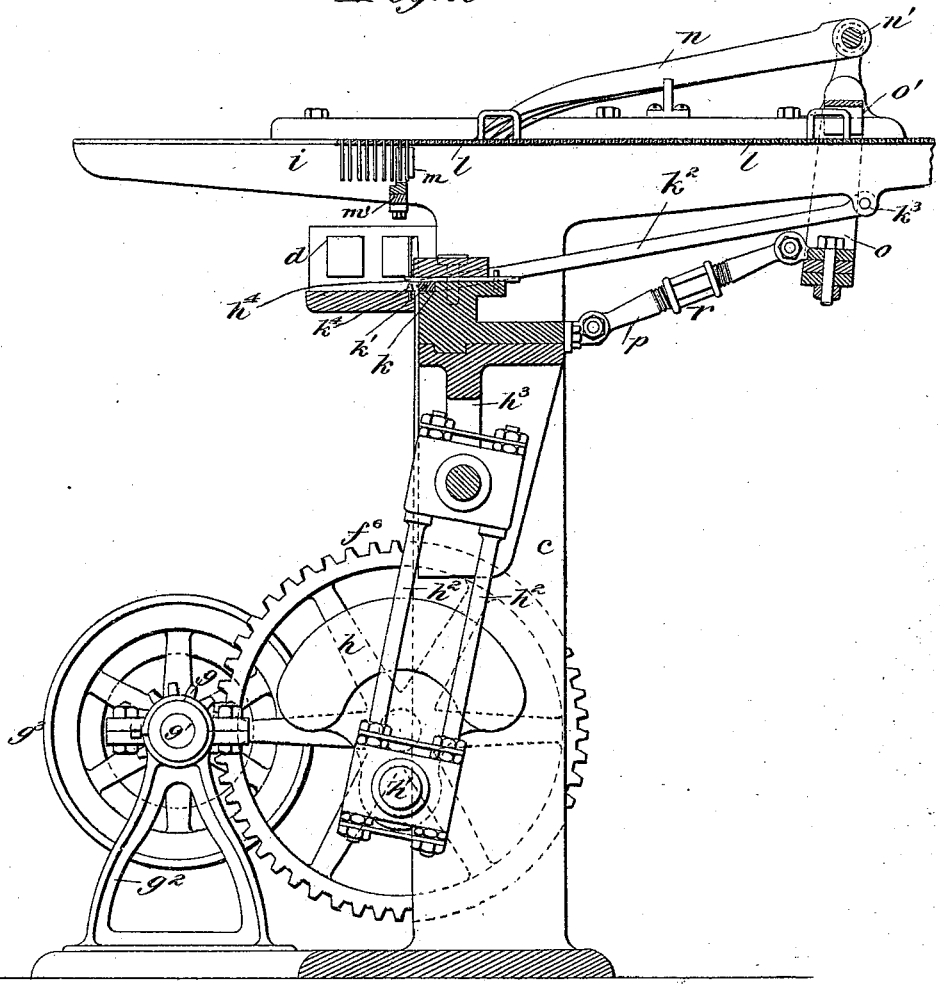
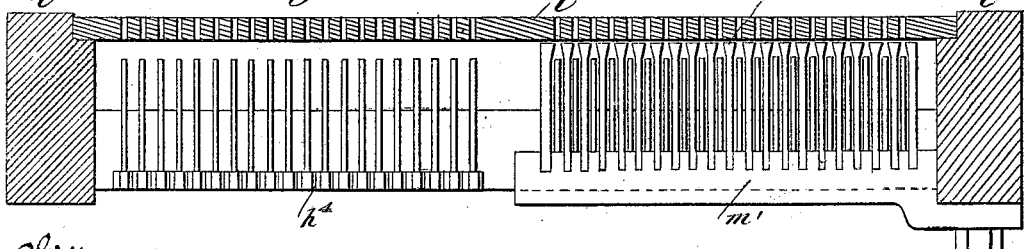
Witnesses  Inventor
J. F. Coleman  Edwin J. Young
Harry G. Davis  by Wm. N. Fincrel
 Atty.

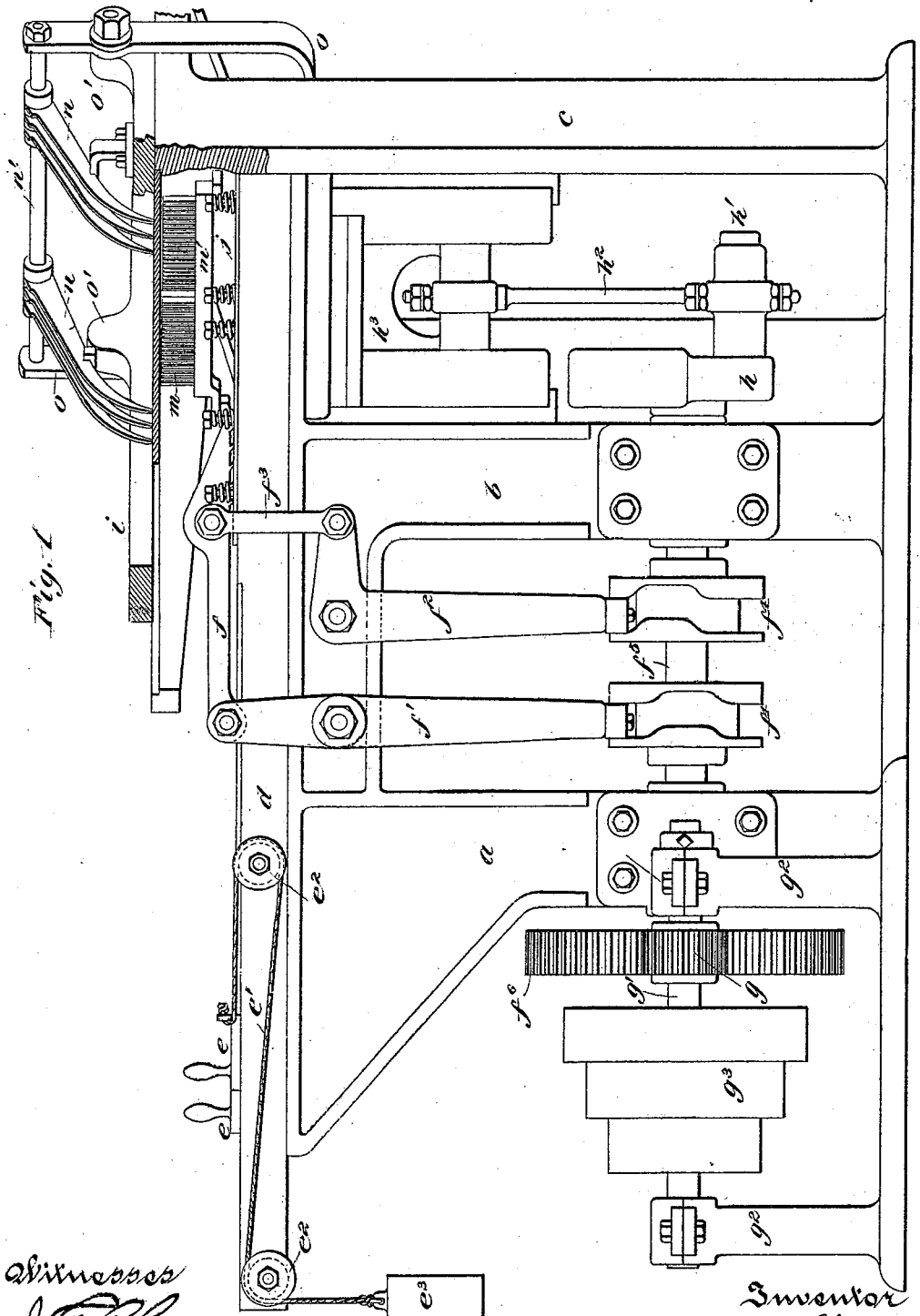

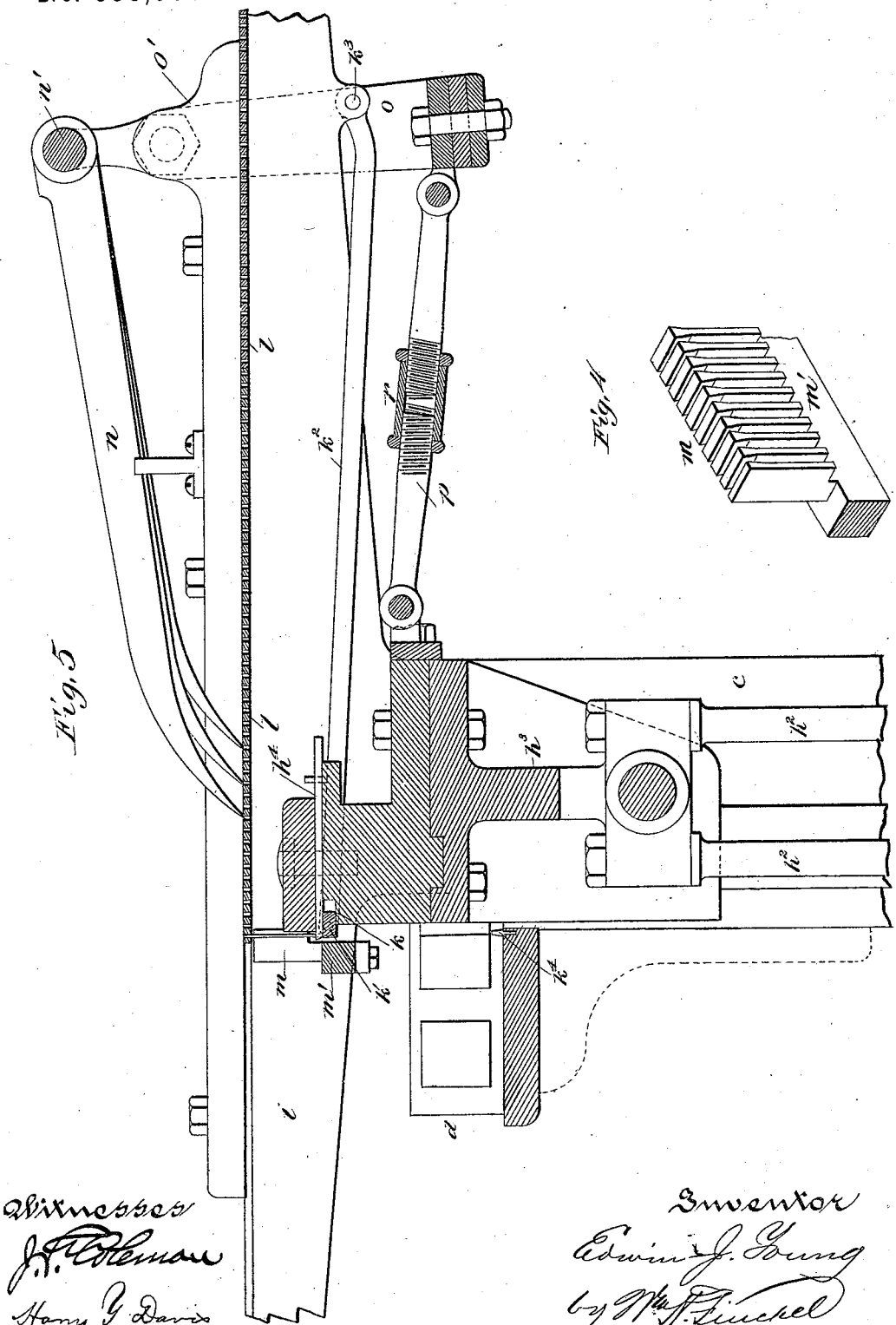

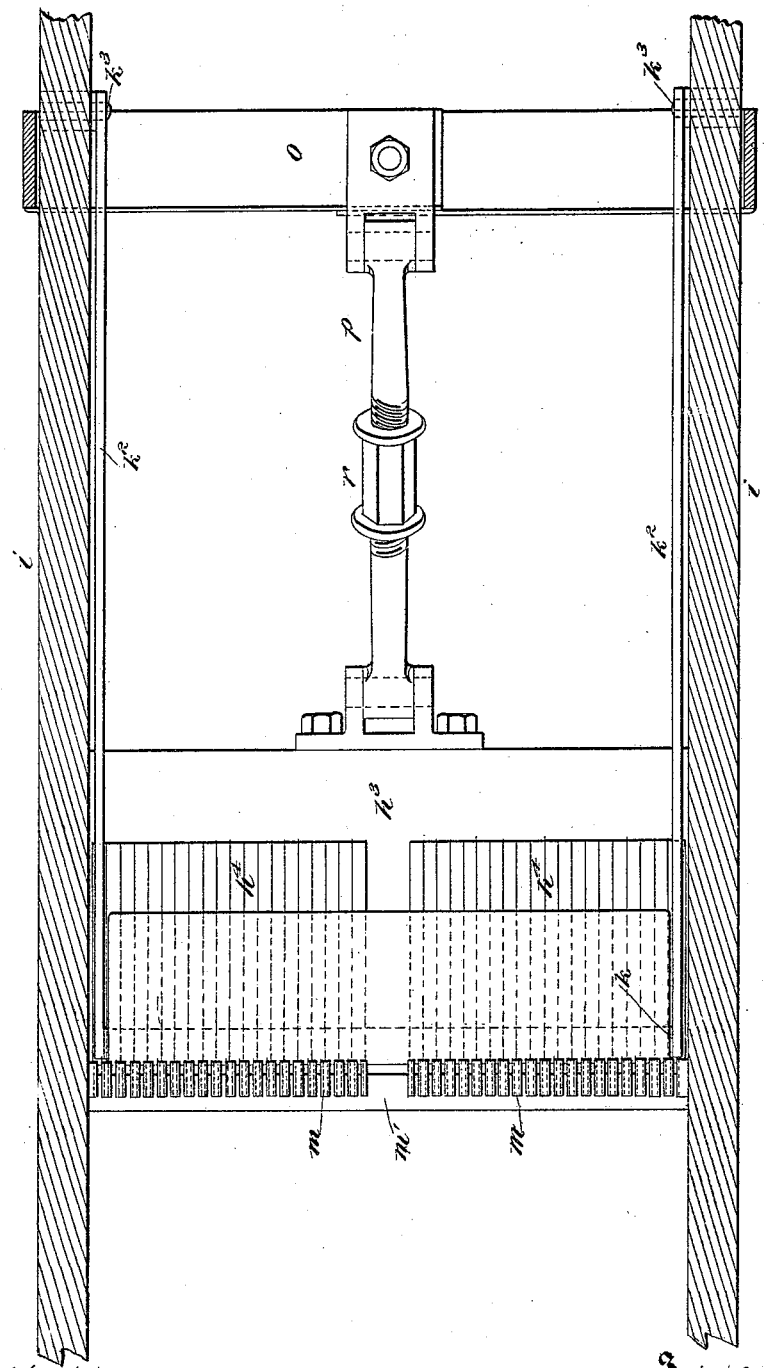

UNITED STATES PATENT OFFICE.

EDWIN J. YOUNG, OF WADSWORTH, OHIO.

MATCH-MACHINE.

SPECIFICATION forming part of Letters Patent No. 553,888, dated February 4, 1896.

Application filed October 19, 1894. Serial No. 526,393. (No model.)

*To all whom it may concern:*

Be it known that I, EDWIN J. YOUNG, a citizen of the United States, residing at Wadsworth, in the county of Medina and State of Ohio, have invented a certain new and useful Improvement in Match-Machines, of which the following is a full, clear, and exact description.

This invention relates to machines for making match sticks or splints and sticking them in the plates, by means of which the splints are handled collectively for subsequent manipulation.

The object of the invention will be ascertained best by stating in the first instance, in a somewhat summary manner, the improvements made and then describing such improvements in detail.

The improvements constituting the present invention are, first, the means for effecting the movement of the abutment-block or that device which is moved beneath the cutters to support the splints while they are being stuck in the sticking-plate by the upward movement of the cutting apparatus; second, the combination with the first improvement of guides for directing the splints accurately and unerringly into the sticking-plate as they are moved by the operation just described; third, the means for feeding the sticking-plate as successive rows of splints are stuck therein, and for compensating for wear of the feeding-fingers.

In carrying out the first improvement, I arrange the abutment-block in the cutting apparatus as usual, and by means of radius bars or links attached at one of their ends to the abutment-block and at their other ends to a fixed portion of the machine—as, for example, to the frame of the sticking-plate receiver—effect the necessary back-and-forth movement of such abutment-block relatively to the cutters as the cutting apparatus is moved up and down.

The second improvement consists in the combination with the first improvement of guides for receiving the cut splints or sticks and directing them into the sticking-plate under the movement of the cutter-carrier and while supported by the abutment-block, the said guides consisting of a supporting bar and plates rising therefrom and converging toward their upper ends.

The third improvement comprises a vibrating frame in which the plate-feeding fingers are arranged, which frame is vibrated by a rod connecting it with the cutting apparatus or cutter-carrier, the length of the said rod being adjustable in order to compensate for wear of the fingers and to insure the accurate progression of the feeding-plate.

In the accompanying drawings, illustrating my invention, in the several figures of which like parts are similarly designated, Figure 1 is a front elevation with parts of the sticking-plate and its receiver broken away. Fig. 2 is a vertical section. Fig. 3 is a sectional elevation of the sticking-plate and its receiver in front of the guides, showing one-half of the guides removed at the left and exposing at the left splints in position to be raised into the sticking-plate. Fig. 4 is a perspective view of part of a modified form of guide. Fig. 5 is a vertical section of those parts of the machine containing my improvements, showing the parts in position for sticking the splints in the sticking-plate; and Fig. 6 is a horizontal section taken in a plane intersecting the lower portion of the sides of the receiver-frame and below the sticking-plate.

Parts of the machine which are essentially as usual in this class of machines are as follows, excepting as hereinafter specified—namely: uprights $a\ b\ c$, stock-troughs or ways $d$ supported thereon, the stock-feeding devices consisting of followers $e$ and their propelling cords $e'$ passing about pulleys $e^2\ e^2$ and provided with weights $e^3$, the feed-dogs $f$ having the motor-levers $f'\ f^2$, the lever $f^2$ being an elbow-lever connected with the forward end of the feed-dogs by a link $f^3$ to lift them to get a fresh hold, the lever-actuating cams $f^4\ f^4$, mounted upon shaft $f^5$, which shaft has a toothed wheel $f^6$ in mesh with a pinion $g$ on a driving-shaft $g'$, mounted in suitable stands $g^2$, the said driving-shaft having a power appliance, such as a cone-pulley $g^3$, a weighted or other eccentric or crank $h$ on the shaft $f^5$, having a wrist-pin $h'$ to which is applied a pitman $h^2$, which is connected to the cutter-carrier $h^3$, this cutter-carrier having a vertically-reciprocating motion in guides on the uprights $b$ $c$, the sticking-plate receiver $i$, mounted upon the uprights above the stockways and obliquely to such stockways, and spring stock-retaining or press plates $j$. The cutters or knives $h^4$ also may be as usual.

In a transverse recess or slideway $k$ in the cutter-carrier is arranged the abutment-block $k'$ and this block is given its back-and-forth movement in said recess by means of the links or radius-bars $k^2$ $k^2$, which are pivoted to the receiver-frame at $k^3$ at one of their ends and to the abutment-block at their other ends. Now it will be seen that since the radius-bars $k^2$ are fixed at $k^3$ they will move the abutment-block from beneath the cutters as the cutter-carrier descends and cuts the splints, and thereafter as the cutter-carrier rises with the cut splints or match sticks, the abutment-block will be forced beneath the outer cutting ends of the cutters and so support the splints or sticks while they are being stuck in the sticking-plate $l$. This sticking-plate may be of usual construction and is mounted to slide in ways in its receiver $i$.

In Fig. 2 the cutter-carrier is shown at the end of its downstroke, having cut off a series of splints and having been brought into the usual correlation with the starting-pins $k^4$, the abutment-block having been receded, while in Fig. 5 the parts are shown in the act of sticking the cut splints and the abutment-block projected beneath the active ends of the cutters to support the splints. These movements of the abutment-block are positively effected and in an unfailing manner and by simple and direct-acting means.

The guides for leading the splints or sticks to and insuring their entrance into the appropriate holes in the sticking-plate $l$, comprise a series of upright plates $m$ inserted in kerfs or grooves in a bar $m'$, Fig. 3, or made integral with such bar, Fig. 4. The bar $m'$ is fastened to the receiver-frame in front of the path of movement of the cutters and the rear or proximate ends of the guides project over into this path of movement and above the highest limit of the throw or stroke of the cutter-carrier. The guides taper from bottom to top, converging toward the top, so that as the splints are moved up by the cutter-carrier they enter the guides and by them are certainly and accurately directed toward the appropriate holes in the sticking-plate and their insertion in such holes insured, the said guides serving to lift up and hold upright all those splints whose insecurity and unsteadiness of hold in and by the cutters may have caused them to lean over. As the sticking-plate is progressively moved outward, the stuck splints are carried by it out of and away from the guides in proper separated position for transference to the heading apparatus.

It is manifestly of the utmost importance that the sticking-plate be fed forward accurately in time with the cutting apparatus in order to insure registry with the rising splints, and to effect this I mount the fingers $n$ upon a bar $n'$, which bar is supported in a vibrating frame $o$, which is pivoted upon lugs $o'$ rising from the receiver-frame. This vibrating frame has its longer member extended below the receiver-frame to a point below the upper limit of travel of the cutter-carrier, and such longer member is connected with the cutter-carrier by a connecting-rod $p$, whereby as the cutter-carrier reciprocates vertically the said frame $o$ is vibrated upon its bearing-studs and the fingers have imparted to them the necessary movement to actuate the fingers to feed forward the sticking-plate progressively with the sticking of the splints. Inasmuch as there is necessity for absolutely accurate feed of the sticking-plates, and since wear of the fingers and moving parts is unavoidable and must be compensated for, I make the connecting-rod $p$ in two parts and unite these parts by a right-and-left hand nut or turnbuckle $r$, whereby the said rod may be shortened or lengthened as desired, and thus the necessary throw of the vibrating frame be maintained.

It will be observed that the rod $p$ may be set to move the fingers a distance just sufficient to feed the plate the proper distance to receive the successive rows of splints, and thereafter should the rod be raised or lowered beyond that point no adverse effect upon the plate is possible. The frame $o$ receives its farthest movement forward before the cutter-head has reached the limit of its upstroke and before the sticking of the splints begins, and thereafter upon the further upward movement of the cutter-carrier the said rod reverses the movement of the vibrating frame and frees the fingers from engagement with the sticking-plate while the splints are being stuck.

I have thus described the principle of my invention and the best mode in which I have contemplated applying that principle; but I wish to be understood as not limiting my invention to mere details, excepting in so far as they are of the essence of the invention as herein claimed.

What I claim is—

1. An abutment-block for match-machines having actuating radius-bars fixedly pivoted to a stationary part of the machine, substantially as described.

2. In a match-machine, a vertically-reciprocating cutter-carrier, an abutment-block arranged in a recess therein, and radius bars or links pivoted to the abutment-block at one of their ends and to a fixed portion of the machine at their other ends, substantially as described.

3. In a match-machine, the combination of a cutter-carrier, means to reciprocate it vertically in a right line, an abutment-block arranged in a recess in said carrier below the cutters therein, and links jointed to the ends of such abutment-block at one of their ends, and pivoted at their other ends to a fixed portion of the sticking-plate receiver, substantially as described.

4. In a match-making machine, the combination of a sticking-plate, a vertically-reciprocating cutter-carrier, cutters therein, an abutment-block arranged in a recess in said cutter-carrier beneath the cutters, radius bars or links pivoted to the abutment-block at one of their ends and to a fixed portion of the machine at their other ends, and guides for receiving the cut splints or sticks to direct them into the sticking-plate under the movement of the cutter-carrier and support of the abutment-block and consisting of a supporting-bar and plates rising therefrom and converging toward their upper ends, substantially as described.

5. In a match-making machine, the combination of a sticking-plate, a vertically-reciprocating cutter-carrier, cutters therein, an abutment-block arranged in a recess in said cutter-carrier beneath the cutters, radius bars or links pivoted to the abutment-block at one of their ends and to a fixed portion of the machine at their other ends, and guides for receiving the cut splints or sticks to direct them into the sticking-plate under the movement of the cutter-carrier and support of the abutment-block and consisting of a supporting-bar and upright plates thereon having rearward portions overhanging the path of movement of the cutter and tapering from top to bottom to form upwardly-converging ways for the splints, substantially as described.

6. In a match-making machine, the sticking-plate, a vertically-reciprocating cutter-carrier, and cutters therein, an abutment-block arranged in a recess in said cutter-carrier beneath the cutters, means to actuate such abutment-block, fingers engaging said sticking-plate, the vibrating frame $o$, a bar $n$ therein upon which the fingers are pivoted, and the connecting-rod $p$, pivoted at one end to an extension of said frame downward below the upper limit of travel of the cutter-carrier and at its other end pivoted directly to the cutter-carrier and deriving motion from such cutter-carrier to effect the full forward stroke of the fingers and plate before the cutter-carrier reaches the limit of its upstroke and before the sticking of the splints begins, the said rod thereafter in the continued upstroke of the cutter-carrier serving to back off the fingers, substantially as described.

7. In a match-making machine, the sticking-plate, a vertically-reciprocating cutter-carrier, and cutters therein, an abutment-block arranged in a recess in said cutter-carrier beneath the cutters, means to actuate such abutment-block, fingers engaging said sticking-plate, the vibrating frame $o$, upon which the fingers are pivoted, and the adjustable connecting-rod $p$ pivoted at one end to an extension of said frame downward below the upper limit of travel of the cutter-carrier and at its other end pivoted directly to the cutter-carrier and movable by such cutter-carrier after the latter has cut the splints and as it rises to stick them, and serving to move the vibrating frame forward and cause the fingers to feed forward the sticking-plate into position to receive the cut splints then ascending to it, and thereafter and before the splints are stuck moving such vibrating frame reversely and thereby backing off the fingers, substantially as described.

In testimony whereof I have hereunto set my hand this 17th day of October, A. D. 1894.

EDWIN J. YOUNG.

Witnesses:
E. S. PARDEE,
MINNIE YOUNG.